Dec. 20, 1960  L. M. GROTKE  2,965,242
PANEL JOINT ASSEMBLY
Filed Dec. 22, 1959  4 Sheets-Sheet 1
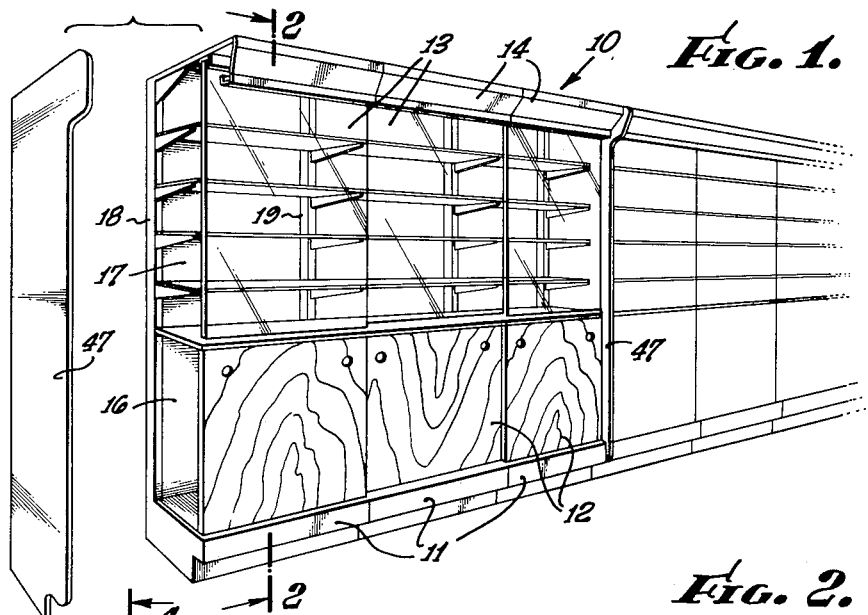
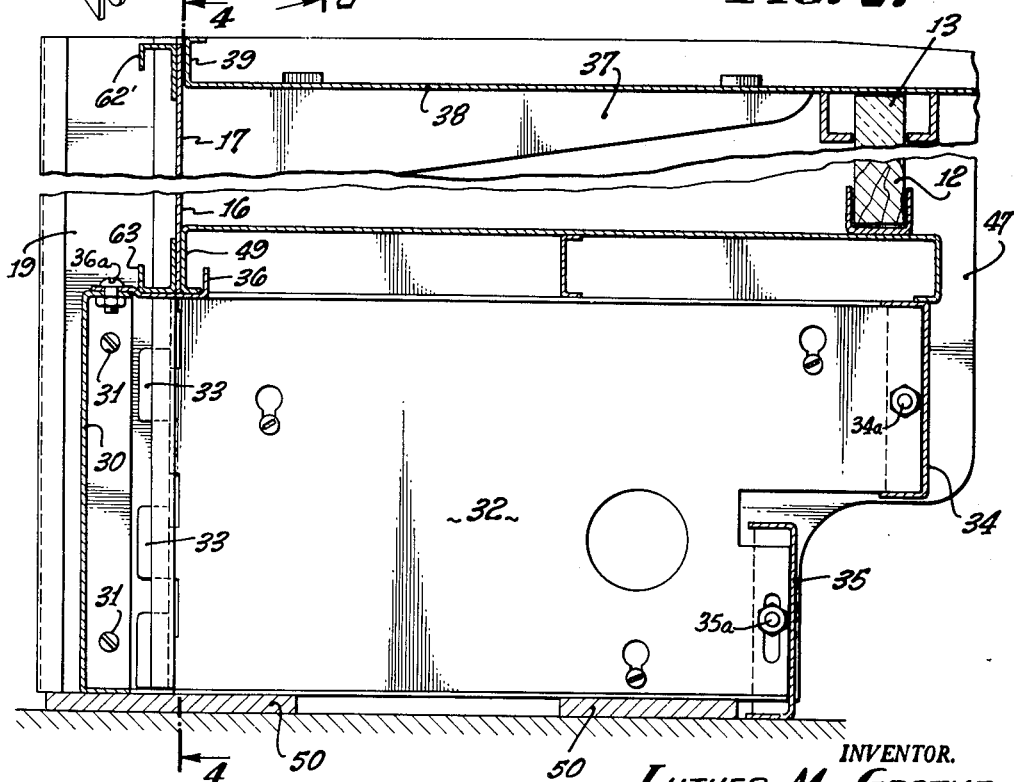
INVENTOR.
LUTHER M. GROTKE
BY
ATTORNEY.

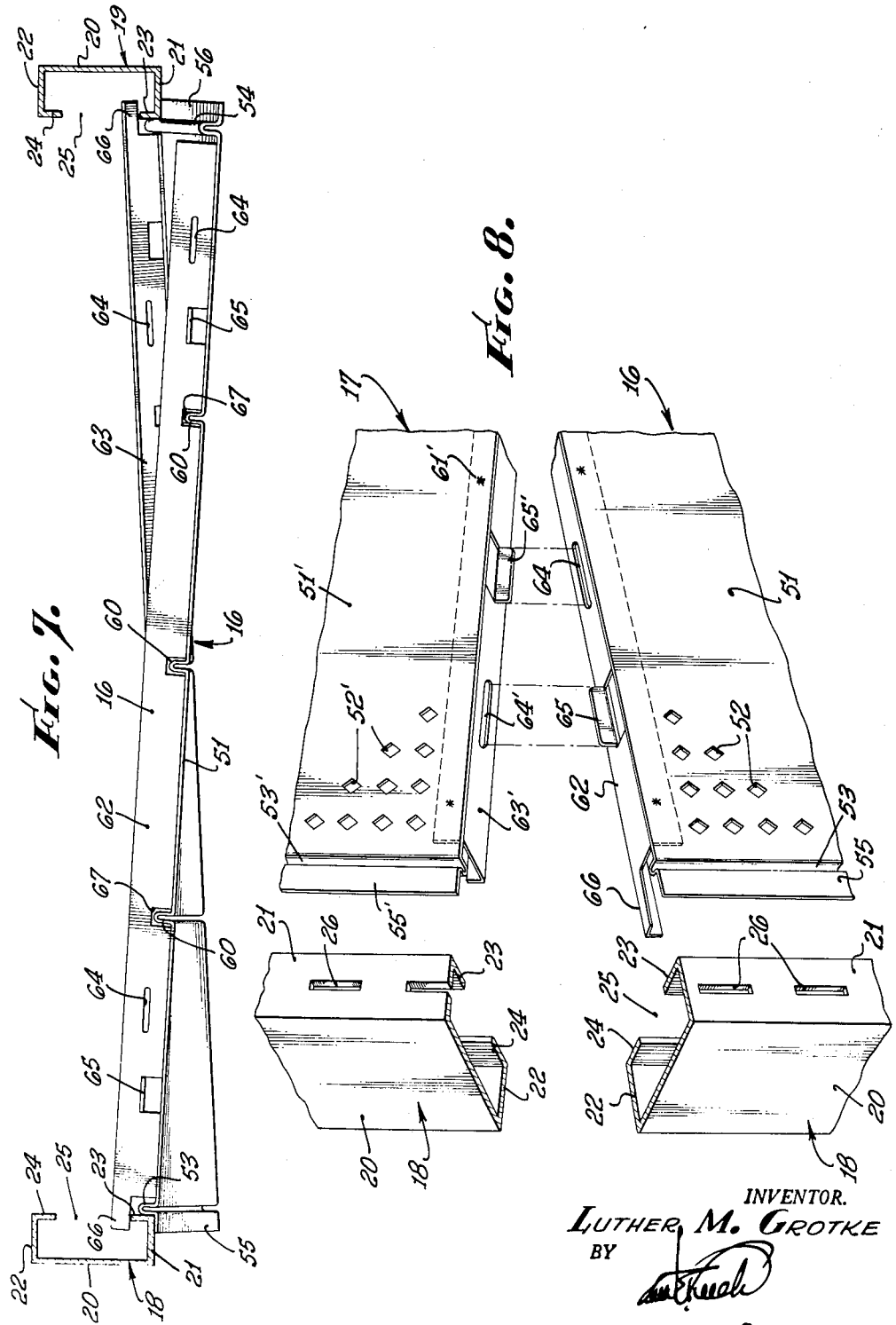

Dec. 20, 1960

L. M. GROTKE 2,965,242

PANEL JOINT ASSEMBLY

Filed Dec. 22, 1959

INVENTOR.
LUTHER M. GROTKE
BY

ATTORNEY.

Dec. 20, 1960
L. M. GROTKE
2,965,242
PANEL JOINT ASSEMBLY
Filed Dec. 22, 1959
4 Sheets-Sheet 4
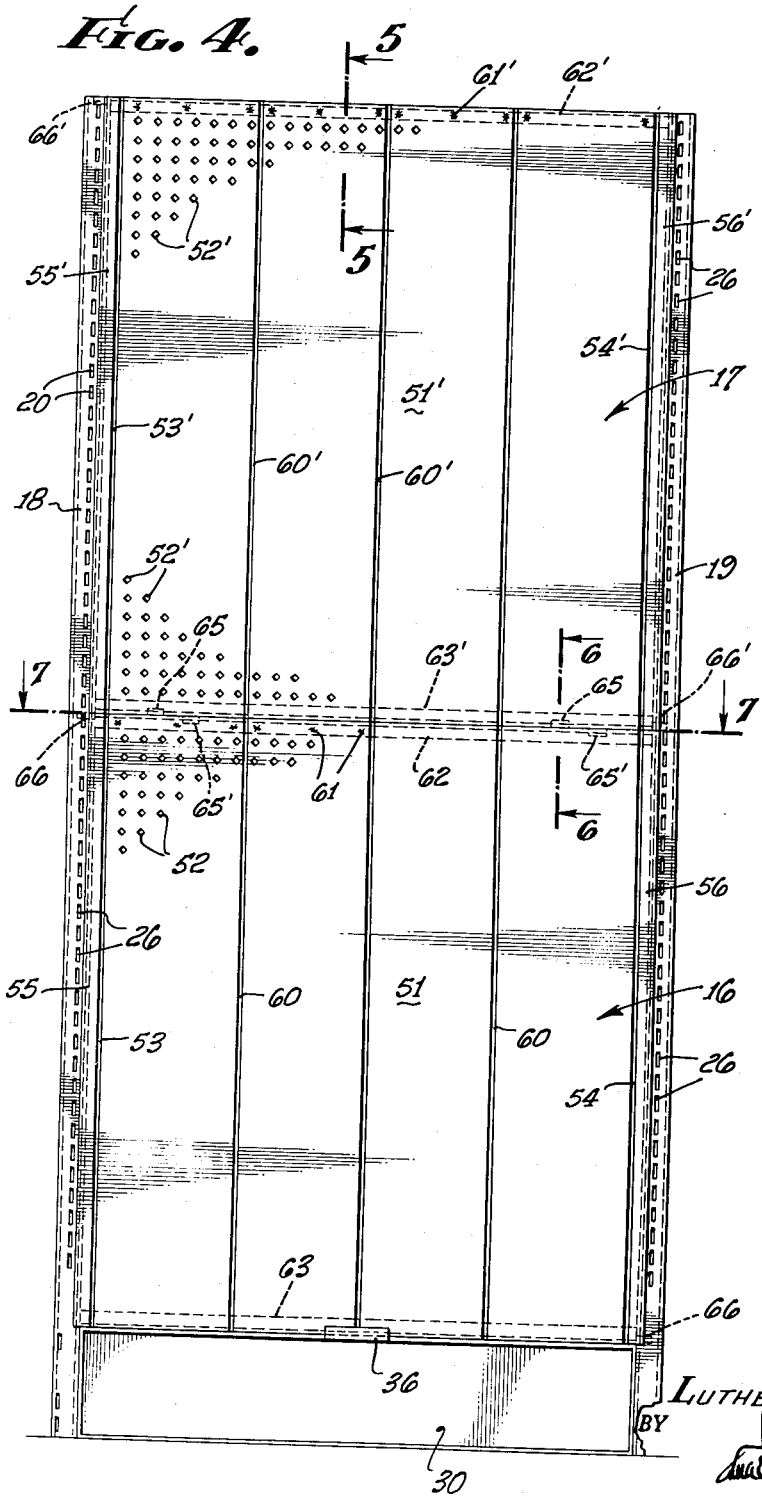
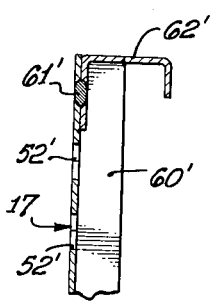
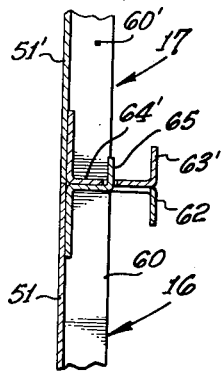
INVENTOR.
LUTHER M. GROTKE
BY
ATTORNEY.

United States Patent Office 2,965,242
Patented Dec. 20, 1960

2,965,242

PANEL JOINT ASSEMBLY

Luther M. Grotke, El Monte, Calif., assignor to M & D Store Fixtures, Inc., a corporation of California Filed Dec. 22, 1959, Ser. No. 861,284

5 Claims. (Cl. 211—148)

This invention relates to store fixtures and is particularly useful in wall shelving and display cabinet structures.

In a type of such structures in wide use, the main frame includes a pair of vertical posts at opposite sides of the unit on which one or more back panels are supported at their side edges. These panels form a backwall for the shelves which are supported at their opposite ends on brackets hooking into perforations in the posts.

It is an object of the present invention to provide a novel panel and means for assembling the same in such a structure which will permit a plurality of panels to be readily assembled and disassembled without the use of fasteners.

Another object is to provide such a panel which is simple in construction, strong, light in weight, and relatively inexpensive to manufacture.

A further object is to provide such a panel which is designed to be flexed slightly to insert it in place between said posts, and which, when released from pressure, resumes its normal flat shape in the assembled relation with said posts.

A yet further object is to provide such a panel which, in plural assemblies thereof in superimposed relation between said posts, interlock with each other and said posts, and are retained in this interlocked assembled relation by gravity.

The manner of accomplishing the foregoing objects as well as further objects and advantages will be made manifest in the following description taken in connection with the accompanying drawings in which:

Fig. 1 is a perspective view of a multi-section store cabinet with the plywood end plate at the near end removed to illustrate the structure of the unit.

Fig. 2 is a fragmentary enlarged vertical sectional view taken on the line 2—2 of Fig. 1 for illustrating the manner in which a preferred embodiment of the present invention is incorporated in the structure of said unit.

Fig. 4 is a diagrammatic view taken at a reduced scale on line 4—4 of Fig. 2 and presenting a face view of a pair at the panels of the present invention as these are related with the side posts of the unit in which said panels are assembled, after said assembly has been effected.

Fig. 5 is an enlarged detail fragmentary sectional view taken on the line 5—5 of Fig. 4.

Fig. 6 is an enlarged detail sectional view taken on the line 6—6 of Fig. 4.

Fig. 7 is an enlarged detail horizontal sectional view taken on the line 7—7 of Fig. 4 with the upper of the two panels shown in Fig. 4 removed and with the lower panel flexed as when effecting the assembly of this panel with the side posts of the structure.

Fig. 8 is a perspective view diagrammatically illustrating the details of the interlocking means provided on the panels of the invention for retaining these in assembly with the side posts of the structure.

Figure 3:
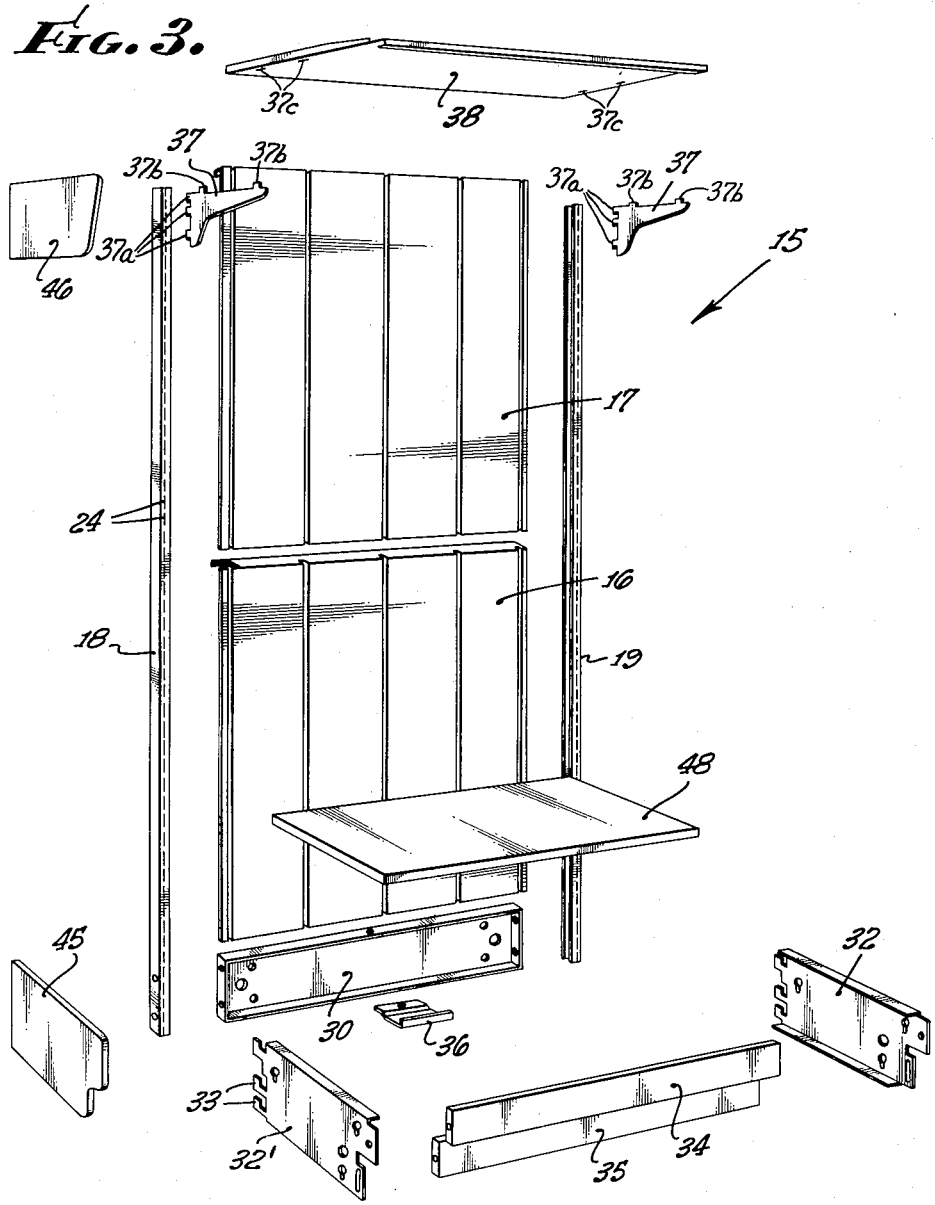
Fig. 3 is a perspective exploded view of certain parts employed in making the cabinet illustrated in Fig. 1 which are also adapted to be used in the manufacture of an ordinary wall shelf unit and which incorporate a preferred embodiment of the present invention.

Referring specifically to the drawings, and particularly to Fig. 1, a multi-section merchandise display cabinet 10 is here illustrated which is made up of like sections 11 assembled end-to-end, the cabinet 10 being adapted to be placed back-to-back with a similar cabinet or placed with its back against a wall to form a wall display cabinet. While each of the sections 11 may be provided with wooden sliding doors 12, glass doors 13 and an illuminated sign 14, the parts forming the basic structure of each of these sections, which are shown in exploded relation in Fig. 3, are also used in the assembly of a simple wall shelf unit 15.

The invention has primarily to do with the structure and mode of mounting of a pair of like back panels 16 and 17 which are part of the basic group of parts illustrated in Fig. 3. Besides the panels 16 and 17, the wall unit 15 includes a pair of posts 18 and 19 which are of identical channel construction each post having an outwardly disposed main web 20, front and rear flanges 21 and 22 and reinforcing flanges 23 and 24 which are inbent from the free edges of flanges 21 and 22. The opening 25 of each of the channels 18 and 19 faces inwardly. Flange 21 and, if desired, also flange 22 is provided with a vertical line of slots 26.

The posts 18 and 19 are held in vertical parallel relation by a box-like sheet metal center channel 30 opposite ends of which extend into channel post openings 25 against the webs 20 of these posts and are secured thereto by bolts 31 (Fig. 2). Transverse footing members 32 and 32' are provided having lugs 33 which interlock with lower slots 26 of the posts 18 and 19 to unite said members with said posts. Front ends of the members 32 and 32' are united by kick plates 34 and 35 being rigidly secured thereto by bolts 34a and 35a respectively, and a panel and shelf retaining angle 36 is bolted centrally by a bolt 36a to the upper edge of center channel 30.

A pair of top pan brackets 37 having lugs 37a which interlock with slots 26 in upper portions of the posts 18 and 19 so as to support said brackets on these posts. Brackets 37 also have upwardly extending lugs 37b which interlock with suitable perforations 37c provided in a top pan 38 having a vertical backwall 39 so as to unite this top pan with the posts 18 and 19 and provide a spacer for the upper ends of said posts. When the top pan 38 is so united with posts 18 and 19 the backwall 39 is located about $\frac{1}{16}$ of an inch forwardly from front faces of posts 18 and 19 (Fig. 2). The wall units 15 when placed end-to-end are bolted together and the endmost sections of such a multi-section cabinet are provided with decorative plywood end plates 45 and 46 located at the bottom and top of the exposed side of the unit or more ornate unitary plywood end plates 47 may be secured to outside ends of the outer units as shown in Fig. 1.

A relatively deep bottom shelf 48, of inverted sheet metal box structure, is laid on top of footing members 32, the upper kick plate 34 and supporting angle 36 to support said shelf. This shelf has a downturned and inturned rear wall 49 which rests directly on the angle 36 and against the forward upturned end of this angle as shown in Fig. 2 so as to prevent said shelf being pulled forwardly.

When installing a wall unit 15, irregularities in the surface of the supporting floor are compensated for by inserting shims 50 between the floor and the center channel 30 and the footing members 32.

Referring now to Figs. 4, 5, 6, 7 and 8, the structure and mode of assembly of the panels 16 and 17 in the wall unit 15 will be described. These panels being identical, a description of panel 16 will suffice for both. This panel includes a unitary rectangular panel plate 51 provided with perforations 52 by which merchandise supporting brackets (not shown) may be applied to the panel, and side edge reinforcing ribs 53 and 54 which are bent from the material of the plate 51 and spaced apart so as to just snugly fit in between flanges 23 of posts 18 and 19, and provide border flanges 55 and 56 which fit flush against the front faces respectively of the posts 18 and 19. Similar internal, integral reinforcing ribs 60 are provided in the panel plate 51 for strengthening this.

Spot welded respectively as at 61 to upper and lower edge portions of the panel plate 51 are edge reinforcing channels 62 and 63. These channels are identical in construction and merely disposed in end-for-end inverted relation to each other at the upper and lower edges of the panel 16. Slots 64 and tongues 65 are provided in each of the reinforcing channels 62 and 63 so that when panel 17 is superimposed upon panel 16 in edge-to-edge relation and supported on panel 16, the tongues 65 on each of the meeting edges of these panels enter into the slots 64 formed in other of these edges.

The right end of the upper channel 62 is plain and terminates short of overlying the adjacent vertical side rib 54 of this panel. The opposite end of channel 62 has a finger 66 which cooperates with an upper portion of border flange 55, when panel 16 is assembled with the wall unit 15 to snugly locate that corner of panel 16 relative to the flange 23 of post 18.

Due to the inversion of the lower reinforcing channel 63, the finger 66 on this reinforcing channel is located at the right lower corner of the panel 16. It will thus be seen that the two fingers 66 provided on panel 16 are at opposite ends of a diagonal running from the upper left corner to the lower right corner of this panel. Reinforcing channels 62 and 63 are also provided with notches 67 which accommodate the internal reinforcing ribs 60 formed in the material of the rectangular plate 51 of which panel 16 is formed.

The panels 16 and 17 are designed to be assembled or disassembled with the wall unit 15 after all of the other elements of this unit shown in Fig. 3 have been permanently assembled together.

The integral ribs 53, 54 and 60 in the panel plate 51 and the upper and lower reinforcing channels 62 and 63 spot welded to upper and lower edges of said plates make each of panels 16 and 17 a very rigid structure when its side edges are held in place in the unit 15 as shown in Fig. 4. However, before either of these panels is so assembled with the unit 15, it has a slight degree of flexibility so that it can be twisted as panel 16 is shown in Fig. 7 to extend the fingers 66 inwardly while the lower left and upper right corner portions of the panel 16 are sprung outwardly. While thus twisted, the panel 16 can be rotated about an axis normal to the center of the panel in a clockwise direction to shift the fingers 66 closer together, in vertical projection, than the horizontal distance between flanges 23 of the posts 18 and 19. The panel 16 is now moved bodily inwardly to bring the upper portion of flange 55 and the lower portion of flange 56 flush, respectively, with the front faces of the posts 18 and 19 and the panel 16 is then, while still twisted in this manner, rotated in a counterclockwise direction to shift the upper left finger 66 and the lower right finger 66 laterally behind the respective adjacent inbent flanges 23 of the posts 18 and 19. This movement also shifts the upper portion of flange 55 and the lower portion of flange 56 laterally in front of posts 18 and 19 respectively. The situation thus produced is illustrated in Fig. 7 which shows the panel 16 still held in twisted condition.

The force applied to twist the panel 16 is now relaxed, allowing this to return to its normal condition in a flat plane and the lower left and upper right corner portions of the panel thus naturally extend themselves into the space between the flanges 23, whereby the flanges 55 and 56 lie flat against the front faces of posts 18 and 19.

Assuming that the bottom shelf 48 of the wall unit 15 has already been inserted in place as shown in Fig. 2, the panel 16 is now allowed to drop downwardly behind the rear wall 49 of shelf 48 and snugly occupy the space behind this wall and come to rest on the panel and shelf support angle 36. Engagement of panel 16 with rear wall 49 of main shelf 48 holds the lower left corner of the panel 16 snugly against the front face of post 18.

As the structure of panel 17 is identical with that of panel 16, above described in detail, mention of specific parts of panel 17 will identify these by the same respective reference numerals applied to corresponding parts of panel 16 but with prime added.

Following the assembly above described of panel 16 with the other parts of wall unit 15, the panel 17 is lifted in the hands and the upper edge portion of the panel cocked so as to insert the upper left finger 66' of this panel behind flange 23 of post 18 with the uppermost portion of flange 55' resting against the front face of said post. The upper portion of flange 56' of panel 17 is now allowed to swing inwardly against the front face of post 19. With panel 17 now held approximately vertically, its upper edge portion is slipped upwardly back of the backwall 39 of top pan 38 so as to extend above said backwall about an inch. The panel 17 is then twisted, approximately as panel 16 is shown twisted in Fig. 7, and rotated in a clockwise direction around an axis normal to the center of the panel so as to bring the lower right finger 66' of panel 17 opposite the space inside of post 19 and allow this finger to be pushed to the rear of flange 23 of post 19, thus bringing the flange 56' of said panel flush with the front face of said post throughout its length. The panel 17 is now rotated anti-clockwise, about an axis normal to its center, to shift the lower right finger 66' into channel opening 25 of post 19 behind its flange 23. The lower left corner of panel 17 may then be released from the tension by which the panel was twisted, thereby allowing flange 55' of said panel to spring inwardly into vertical position flush with the front face of post 18.

Panel 17 is now superimposed about one inch above the panel 16 and the assembly of both panels with the wall unit 15 is completed by simply allowing the panel 17 to drop downwardly into interlocking relation with the panel 16. The interlocking of the two panels is accomplished by the tongues 65 on the upper edge of panel 16 entering slots 64' along the lower edge of panel 17 and the tongues 65' on the lower edge of panel 17 entering slots 64 on the upper edge of panel 16.

It is believed clear from the above description, that when the panels 16 and 17 have thus been assembled in the wall unit 15 these panels are rigidly united along both upper and lower edges with the posts 18 and 19 of the unit. While the upper left finger 66' of panel 17 and the lower right finger 66 of panel 16 are not essential in the uniting of these panels with the unit 15, nevertheless the presence of these fingers in panels 16 and 17 permit these panels to be interchangeable in the upper and lower positions in a wall unit 15. Furthermore, with the manufacture of the two panels with identical structures and with the upper and lower reinforcing channels 62, 63, 62' and 63' of said panels, identically alike, very substantial economies are realized in the production of these panels.

While only a single preferred embodiment of the invention is disclosed herein for illustrative purposes, it is to be understood that various changes and modifications may be made in this without departing from the spirit of the invention or the scope of the appended claims.

I claim:

1. In a store fixture the combination of: a pair of parallel side posts, coextensive inwardly extending portions of which provide panel supporting elements; a rectangular sheet metal panel extending between said element; side border flanges on said panel which overlie and engage front faces of said elements; rearwardly extending ribs on said panel engaging inner edges of said elements; and two fingers on said panel extending behind respectively adjacent elements from two diagonally opposite corners of said panel when the latter is in assembled relation with said elements, said panel being flexible so that same may be twisted to place its flanges and ribs along opposite side edges in helical relation whereby the panel may be advanced into assembled relation with said posts by rotating the panel, thus flexed, about an axis normal to the panel center, to insert said fingers behind said elements and then relieving said panel of forces twisting the same.

2. A combination as in claim 1 in which said posts are long enough to accommodate a plurality of said panels in vertically superimposed relation therebetween; and interlocking means provided on horizontal meeting edges of said panels, said means being caused to lock said edges together by the weight of the upper of each adjacent superimposed pair of panels.

3. A combination as in claim 2 in which said fingers and said interlocking means are provided on each panel in a pair of like horizontal reinforcing members provided in mutually end-to-end reversed relation along upper and lower edges of each panel.

4. A combination as in claim 2 in which a support is provided on said fixture onto which the lowermost of said panels will gravitate when assembled between said posts, said support interlocking with the lower edge of said panel to prevent helical twisting of the lowermost panel as aforesaid, until it is lifted out of engagement with said support.

5. A combination as in claim 4 in which a top pan is mounted on upper end portions of said posts, the rear edge of said top pan being spaced forwardly from said posts to provide a space between said pan and said posts which will receive the upper edge portion of the uppermost of said panels when the latter rests against said posts and is elevated past said pan so that said panel portion still lies behind said top pan when said panel has gravitated downwardly into interlocking relation with the panel next therebelow.

References Cited in the file of this patent

UNITED STATES PATENTS

| | | |
|---|---|---|
| 2,156,277 | Corbin | May 2, 1939 |
| 2,626,198 | Vanderveld | Jan. 20, 1953 |
| 2,787,382 | Williams | Apr. 2, 1957 |
| 2,821,274 | Olsen | Jan. 28, 1958 |
| 2,925,918 | Attwood | Feb. 23, 1960 |